United States Patent
Berkey (10) Patent No.: US 6,434,975 B2
(45) Date of Patent: *Aug. 20, 2002

(54) METHOD OF MAKING AN OPTICAL FIBER BY PLACING DIFFERENT CORE TABLETS INTO A CLADDING TUBE

(75) Inventor: George E. Berkey, Pine City, NY (US)

(73) Assignee: Corning Incorporated, Corning, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/844,997

(22) Filed: Apr. 23, 1997

Related U.S. Application Data (60) Provisional application No. 60/016,435, filed on Apr. 29, 1996.

(51) Int. Cl.[7] ............................................. C03B 37/027
(52) U.S. Cl. ............................. 65/403; 65/407; 65/412; 65/36
(58) Field of Search ..................... 65/403, 407, 406, 65/412, 428, 36, 42

(56) References Cited

U.S. PATENT DOCUMENTS

| | | | |
|---|---|---|---|
| 3,455,667 A | * 7/1969 | Snitzer | ........................ 65/42 |
| 4,195,980 A | 4/1980 | Sterling et al. | |
| 4,212,660 A | 7/1980 | Maurer | ........................ 65/3 |
| 4,407,667 A | 10/1983 | Le Noane et al. | |
| 4,486,212 A | 12/1984 | Berkey | ........................ 65/2 |
| 4,668,263 A | * 5/1987 | Yokota | |
| 4,874,416 A | 10/1989 | Yokokawa et al. | ........ 65/3.12 |
| 5,149,349 A | * 9/1992 | Berkey | |
| 5,152,818 A | 10/1992 | Berkey et al. | ........... 65/3.11 |
| 5,267,339 A | 11/1993 | Yamauchi et al. | |
| 5,483,612 A | 1/1996 | Gallagher et al. | ......... 385/127 |
| 5,613,027 A | 3/1997 | Bhagavatula | ............ 385/123 |
| 5,618,325 A | 4/1997 | Baniel | ...................... 65/380 |
| 5,835,655 A | 11/1998 | Liu et al. | ................. 385/124 |
| 5,894,537 A | 4/1999 | Berkey et al. | ............ 385/123 |
| 6,094,263 A | 8/2000 | Okuda et al. | |
| 6,094,942 A | 8/2000 | Falleroni et al. | |

FOREIGN PATENT DOCUMENTS

| | | | | |
|---|---|---|---|---|
| EP | 718244 | * | 6/1996 | |
| EP | 0 737 873 A | | 10/1996 | |
| GB | 1448080 | | 9/1976 | |
| JP | 57111255 | * | 7/1982 | ............ 65/407 |

OTHER PUBLICATIONS

Patent Abstract of Japan 55 158146 A; Publication Date Dec. 9, 1980.

(List continued on next page.)

Primary Examiner—John Hoffmann
(74) Attorney, Agent, or Firm—Timothy R. Krogh (57) ABSTRACT

An optical fiber having optical characteristics that systematically vary along its length is made by inserting a plurality of cylindrical tablets into a cladding glass tube and overcladding the tube with particles of cladding glass. Each tablet contains a core region, and it optionally contains a layer of cladding glass Adjacent tablets are capable of forming different optical fiber sections having different optical properties. Prior to consolidating the glass particles, chlorine flows through the tube and over the tablets. When the tube begins to sinter, the chlorine flow is stopped and the sintering particles generate an inwardly directed force that causes the tube to collapse inwardly onto the tablets which concurrently become fused to each other. The resultant draw blank can be drawn into a low loss optical fiber. This method is particularly useful for making dispersion managed single-mode optical fibers.

30 Claims, 8 Drawing Sheets

OTHER PUBLICATIONS

Patent Abstract of Japan 03 016930 A; Publication Date Jan. 24, 1991.

Patent Disclosure Bulletin (A) Japanese Patent Disclosure No. 55–158146 (1980).

Patent Disclosure Bulletin (A) Japanese Patent Disclosure No. 3–16930 (1991).

Definitions of a core and cladding from Understanding Fiber Opitcs 2nd edition by Jeff Hecht, copyright 1993, p. 447.

S. E. Miller et al., "Optical Fiber Telecommunications", Academic Press, pp. 250–255 (1979).

Hugh O. Pierson, "Handbook of Chemical Vapor Deposition (CVD)", Noyes Publications, pp. 2–3, 339–344 (1992).

Kirk–Othmer, Encyclopedia of Chemical Technology Fourth Edition, vol. 23, John Wiley, pp. 1060–1061 (1997).

Takeshi Ozeki, "Optical Equalizers", Optics Letters, vol. 17, No. 5, pp. 375–377 (1992).

* cited by examiner

METHOD OF MAKING AN OPTICAL FIBER BY PLACING DIFFERENT CORE TABLETS INTO A CLADDING TUBE

CROSS-REFERENCE TO RELATED APPLICATIONS

This is a conversion application of a provisional application known as U.S. patent application Ser. No. 60/016,435 filed on Apr. 29, 1996, and the benefit of priority under 35 U.S.C. §§ 119–120 is hereby claimed.

BACKGROUND

The invention is directed to a method for making an optical fiber having optical properties that systematically vary along its length. This method is particularly useful for making dispersion managed (DM) single-mode optical waveguide fibers.

The potentially high bandwidth of single-mode optical fibers can be realized only if the system design is optimized so that the total dispersion is equal to zero or nearly equal to zero at the operating wavelength. The term "dispersion" refers to pulse broadening and is expressed in ps/nm-km. "Dispersion Product" refers to dispersion times length and is expressed in ps/nm.

When telecommunications networks employ multiple channel communications or wavelength division multiplexing, the system can experience a loss due to four wave mixing. This loss occurs when the signal wavelength is at or near the zero dispersion wavelength of the optical transmission fiber. This has necessitated the exploration of waveguide fiber designs which can minimize signal degradation that results from this non-linear waveguide effect. A dilemma arises in the design of a waveguide fiber to minimize four wave mixing while maintaining characteristics required for systems which have long spacing between regenerators. That is, in order to substantially eliminate four wave mixing, the waveguide fiber should not be operated near its zero of total dispersion, because four wave mixing occurs when waveguide dispersion is low, i.e., less than about 0.5 ps/nm-km. On the other hand, signals having a wavelength away from the zero of total dispersion of the waveguide are degraded because of the presence of the total dispersion.

One strategy that has been proposed to overcome this dilemma is to construct a system using cabled waveguide fiber segments some of which have a positive total dispersion and some of which have a negative total dispersion. If the length weighted average of dispersion for all the cable segments is close to zero, the regenerator spacing can be large. However, the signal essentially never passes through a waveguide length where the dispersion is close to zero, so that four wave mixing is prevented.

The problem with this strategy is that each link between regenerators must be tailored to give the required length weighted average of dispersion. Maintaining cable dispersion identity from cabling plant through to installation is an undesirable added task and a source of error. Further, the need to provide not only the proper dispersion, but also the proper length of cable having that dispersion, increases the difficulty of manufacture and leads to increased system cost. A further problem arises when one considers the need for replacement cables.

Those problems are overcome by the optical fiber disclosed in U.S. patent application Ser. No. 08/584,868 (Berkey et al.) filed Jan. 11, 1996. In accordance with the teachings of the Berkey et al. application, each individual fiber is made to be a self contained dispersion managed system. A pre-selected, length weighted average of total dispersion, i.e., total dispersion product, is designed into each waveguide fiber. Each waveguide fiber is interchangeable with any other waveguide fiber designed for that system link. Thus, the cabled waveguide fibers all have essentially identical dispersion product characteristics, and there is no need to assign a particular set of cables to a particular part of the system. Power penalty due to four wave mixing is essentially eliminated, or reduced to a pre-selected level, while total link dispersion is held to a pre-selected value, which may be a value substantially equal to zero.

In accordance with the Berkey et al. patent application, the dispersion of a DM fiber varies between a range of positive values and a range of negative values along the waveguide length. The dispersion product, expressed as ps/nm, of a particular length, l, is the product (D ps/nm-km*l km). A positive number of ps/nm will cancel an equal negative number of ps/nm. In general, the dispersion associated with a length $l_i$ may vary from point to point along $l_i$. That is, the dispersion $D_i$ lies within a pre-determined range of dispersions, but may vary from point to point along $l_i$. To express the contribution of $l_i$ to the dispersion product, expressed in ps/nm, $l_i$ is made up of segments $dl_i$ over which the associated total dispersion $D_i$ is essentially constant. Then the sum of products $dl_i*D_i$ characterizes the dispersion product contribution of $l_i$. Note that, in the limit where $dl_i$ approaches zero, the sum of products $dl_i*D_i$ is simply the integral of $dl_i*D_i$ over the length $l_i$. If the dispersion is essentially constant over sub-length $l_i$, then the sum of products is simply $l_i*D_i$.

The dispersion of the overall waveguide fiber length is managed by controlling the dispersion $D_i$ of each segment $dl_i$, so that the sum of the products $D_i*dl_i$ is equal to a pre-selected value over a wavelength range wherein signals may be multiplexed. For high rate systems having long regenerator spacing, the wavelength range in the low attenuation window from about 1525 nm to 1565 nm may be advantageously chosen. In this case, the sum of the dispersion products for the DM fiber would have to be targeted at zero over that range of wavelengths. The $D_i$ magnitudes are held above 0.5 ps/nm-km to substantially prevent four wave mixing and below about 20 ps/nm-km so that overly large swings in the waveguide fiber parameters are not required.

The length over which a given total dispersion persists is generally greater than about 0.1 km. This lower length limit reduces the power penalty (see FIG. 5), and simplifies the manufacturing process.

The period of a DM single-mode waveguide is defined as a first length having a total dispersion which is within a first range, plus a second length having a dispersion which is in a second range, wherein the first and second ranges are of opposite sign, plus a transition length over which the dispersion makes a transition between the first and second range. To avoid four wave mixing and any associated power penalty over the transition length, it is advantageous to keep the part of the transition length which has an associated total dispersion less than about 0.5 ps/nm-km as short as possible.

If the transition regions between the regions of higher and lower dispersion are too long, the dispersion in the central portions of the transition regions will be near zero for some finite length of fiber. This will result in some power penalty due to four wave mixing. The longer the transition regions are, the higher the power penalty. The transition regions should therefore be sufficiently sharp that the fiber power penalty does not cause the total system power penalty to exceed the allocated power penalty budget.

A primary requirement of a process for making DM fibers is that it be able to form short transition regions. Moreover, the process of making the DM fiber should not be one that itself induces an excess loss that is unrelated to four wave mixing. Also, the process should be simple and be sufficiently flexible that it can be implemented with a variety of fiber designs and materials. Thus, the DM fiber must be a unitary fiber that is formed by drawing a draw preform or draw blank that includes sections that will form the fiber sections of different dispersion. Such a unitary fiber does not include splices between separately drawn fiber sections, as each splice would introduce additional loss. Ideally, the total attenuation of the unitary fiber is no greater than the composite of the weighted attenuation of each of the serially disposed sections of which it is formed.

An attempt was made to form a DM fiber core rod by fusing together core cane sections by the lathe and torch method. In addition to being difficult to implement, that method suffered from core misalignment, and the flame-caused core wetting problems.

SUMMARY OF THE INVENTION

Therefore, an object of the invention is to provide an optical fiber having distinctly different optical characteristics along its length and an improved method for making such a fiber. Another object is to provide a method for making optical fiber of the aforementioned type wherein the transition lengths between sections of different characteristics are very short. A further object is to provide a method for making fiber of the aforementioned type wherein the attenuation is sufficiently low for use as long distance transmission fiber. Another object is to provide a method for making low loss single-mode DM optical fiber having short transition lengths. Yet another object is to provide a method for making optical fibers exhibiting low polarization mode dispersion.

One aspect of the invention concerns a method of making an optical fiber preform. Briefly, the method comprises the following steps. A coating of cladding glass particles is deposited on the outer surface of a cladding glass tube, and a plurality of tablets is inserted into the cladding glass tube. At least one optical characteristic of at least one of the tablets in the tube is different than that of an adjacent tablet, and each tablet has at least a central region of core glass. While the coated assembly is heated to a temperature less than the sintering temperature of the cladding glass particles, a centerline gas is flowed through the tube. The centerline gas is selected from the group consisting of pure chlorine and chlorine mixed with a diluent gas. Thereafter, the coated assembly is heated to sinter the coating, thereby generating a radially-inwardly directed force that causes the tube to collapse onto and fuse to the tablets, and causing the cladding glass tube to shrink longitudinally, whereby adjacent tablets are urged toward one another and are fused to one another.

A further aspect of the invention concerns a unitary optical fiber that results from the above-described method. The fiber comprises a plurality of serially disposed optical fiber sections, each fiber section having a glass core and a glass outer cladding. The core of a first fiber section is different from the core of each fiber section that is adjacent to the first section. The cladding of the first fiber section is identical to the cladding of the adjacent fiber sections. Between each two adjacent fiber sections is a transition region, the length of which is less than 10 meters.

DETAILED DESCRIPTION OF THE INVENTION

Dispersion Managed Fiber Design

Figure 1:
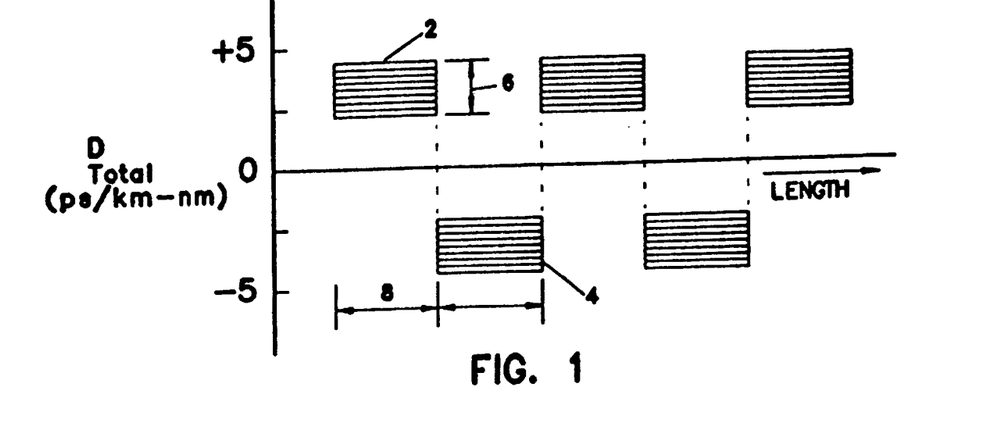
FIG. 1 is an illustration of total dispersion varying along the waveguide fiber length.

The total dispersion of a DM fiber is charted vs. waveguide length in FIG. 1. The total dispersion is seen to alternate between positive values 2 and negative values 4. Whereas FIG. 1 illustrates a plurality of sublengths exhibiting negative dispersion and a plurality of sublengths exhibiting positive dispersion, only one negative dispersion sublength and one positive dispersion sublength are required. The spread in total dispersion values indicated by line 6 illustrates that total dispersion varies with the wavelength of light propagated. The horizontal lines of the spread 6 represent total dispersion for a particular light wavelength. In general, the length of waveguide 8, characterized by a particular total dispersion, is greater than about 0.1 km. There is essentially no upper limit on length 8 except one which may be inferred from the requirement that the sum of products, length ×corresponding total dispersion, is equal to a pre-selected value.

Figure 2:
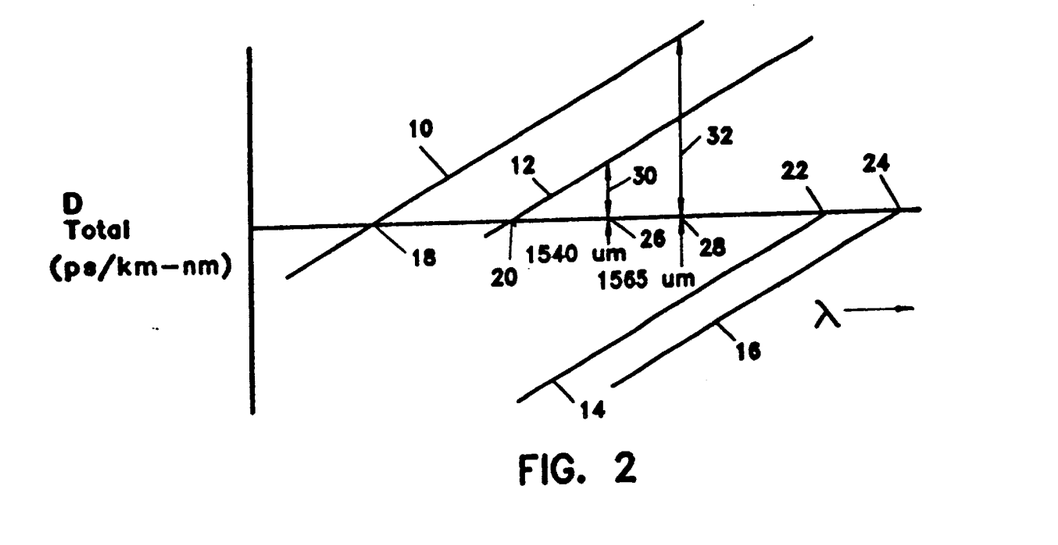
FIG. 2 shows how the zero dispersion of a waveguide fiber may vary to maintain total dispersion of the waveguide within a pre-selected range over a predetermined wavelength window.

The chart of total dispersion vs. wavelength shown in FIG. 2 serves to illustrate design considerations for a DM single-mode waveguide fiber. Lines 10, 12, 14 and 16 represent total dispersion for four individual waveguide fibers. Over the narrow wavelength range considered for each waveguide, i.e., about 30 nm, the dispersion may be approximated by a straight line as shown. The wavelength range in which multiplexing is to be done is the range from 26 to 28. Any waveguide segment which has a zero dispersion wavelength in the range of 18 to 20 may be combined with a waveguide segment having a zero dispersion wavelength in the range 22 to 24, to yield a waveguide having a pre-selected total dispersion over the operating window 26 to 28.

The following example is based on FIG. 2. Take the operating window to be 1540 n to 1565 nm. Assume that the single-mode waveguide fiber has a dispersion slope of about 0.08 ps/nm$^2$-km. Let line 30 be the 0.5 ps/nm-km value and line 32 the 4 ps/nm-km value. Apply the condition that the total dispersion within the operating window must be in the range of about 0.5 to 4 ps/nm-km. A simple straight line calculation then yields zero dispersion wavelength range, 18 to 20, of 1515 nm to 1534 nm. A similar calculation yields a zero dispersion wavelength range, 22 to 24, of 1570 nm to 1590 nm. Algebraic addition of the total dispersion of waveguide fiber segments having dispersion zero within the stated ranges will yield a total dispersion between 0.5 and 4 ps/nm-km.

Figure 3A:
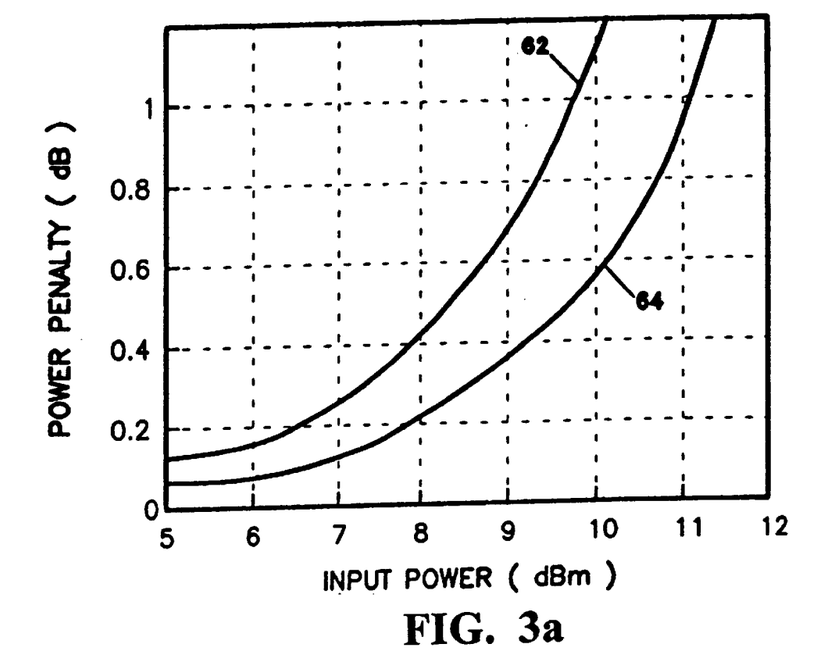
FIG. 3a is a chart illustrating the power penalty vs. input power for a system comprised of particular waveguide sub-lengths having a low total dispersion magnitude.
Figure 3B:
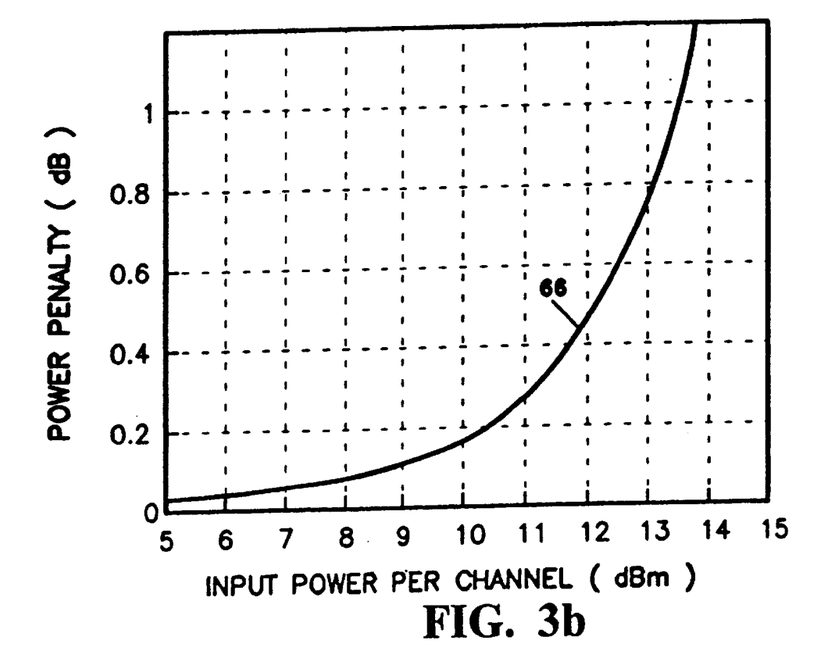
FIG. 3b is a chart illustrating the power penalty vs. input power for a system comprised of particular waveguide sub-lengths having a higher total dispersion magnitude.

The design of the DM fiber depends strongly on the details of the telecommunication system as can be seen in FIGS. 3a and 3b which show power penalty charted vs. input power for a 120 km link having 8 channels, wherein the frequency separation of channels is 200 GHz. In this case the power penalty is that due primarily to four wave mixing. Curve 62 in FIG. 3a rises steeply to a penalty near 1 dB for an input power of about 10 dBm. The penalty is about 0.6 dB for an input power of 10 dBm (curve 64). For both curves the magnitude of the total dispersion is about 0.5 ps/nm-km. However, for the steeper curve 62 the sub-length for total dispersion of a given sign is 10 km. The corresponding sub-length of the dispersion in curve 64 is 60 km. The extra penalty results from the additional transitions through zero dispersion for the shorter, 10 km sub-length case. An alternative statement is for the 10 km case, the phase separation of the signals, which is proportional to the oscillation sub-length, is not large enough to substantially prevent four wave mixing. An "oscillation sub-length" is either the positive or negative dispersion sub-length of a period. Where there is no sign associated with oscillation sub-length, the positive and negative oscillation sub-lengths are taken as equal.

However, magnitude of the total dispersion also has an impact upon phase separation and thus upon power penalty. Curve 66 in FIG. 3b shows the power penalty for a system identical to that shown in FIG. 3a, except that the sub-length is shorter, about 1 km, but the total dispersion magnitude is 1.5 ps/nm-km. Causing the waveguide total dispersion to make wider positive to negative swings reduces power penalty significantly, from 0.6 dB to less than 0.2 dB. The penalty difference of about 0.4 dB/120 km is large enough to be the difference between a functional and non-functional link, especially for long unregenerated links of 500 km or more.

Figure 4:
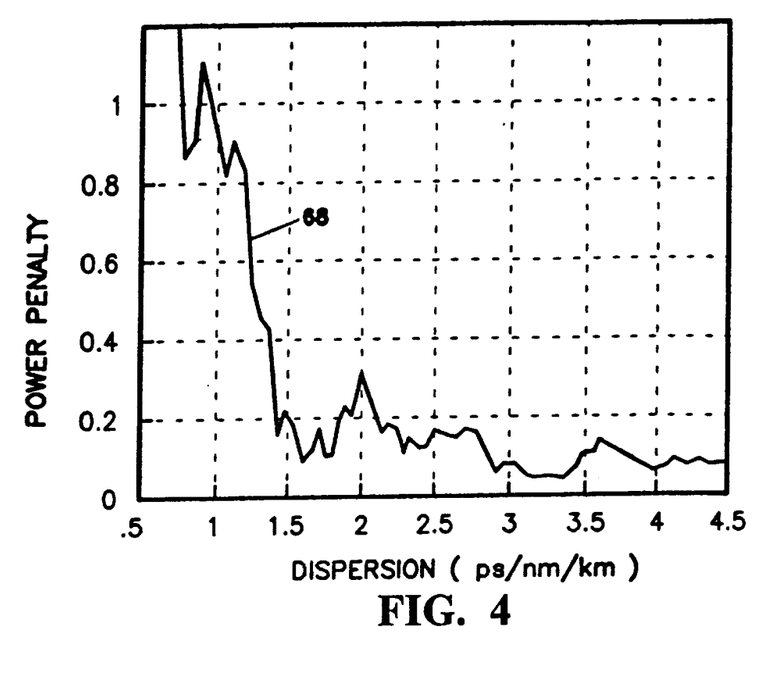
FIG. 4 is a chart of total dispersion vs. power penalty.

FIG. 4 is interpreted in essentially the same manner as FIGS. 3a an 3b. Curve 68 shows power penalty charted vs. total dispersion magnitude. The sub-length of the waveguide is chosen as about 1 km because the length of the shortest cables in general use is about 2 km. Again there are 8 channels having a frequency separation of 200 GHz, a total length of 120 km, and the input power is 10 dBm. Again the power penalty rises steeply when total dispersion magnitude falls below about 1.5 ps/nm-km.

Figure 5:
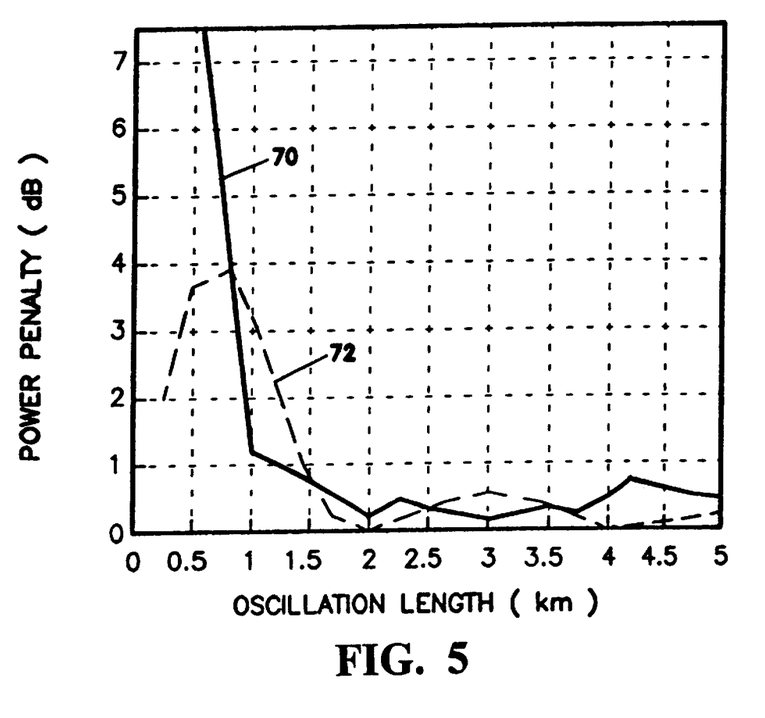
FIG. 5 is a chart of dispersion variation period length vs. power penalty.

System design is shown from another viewpoint in FIG. 5. In this case, the dispersion magnitude is fixed at 1.5 ps/nm-km. Curve 70 represents power penalty vs. sublength magnitude for a system having 8 channels with 200 GHz frequency separation and 10 dBm input power. The length is chosen to be 60 dispersion sub-lengths and the sub-length is allowed to vary. Lower power penalties result when the sub-length is above 2 km. But with the relatively large total dispersion magnitude, little is gained by lengthening the sub-length beyond 2 km. Note the generally lower four wave mixing penalty paid when the number of channels used is reduced to 4 as shown by curve 72.

Another design consideration is the sharpness of the transition length over which the total dispersion changes sign. Here also, the signal phase separation is affected by the transition length. Thus, a shallow transition would cause the signal to travel a waveguide region of near zero total dispersion, and this adversely impacts power penalty caused by four wave mixing.

Figure 6:
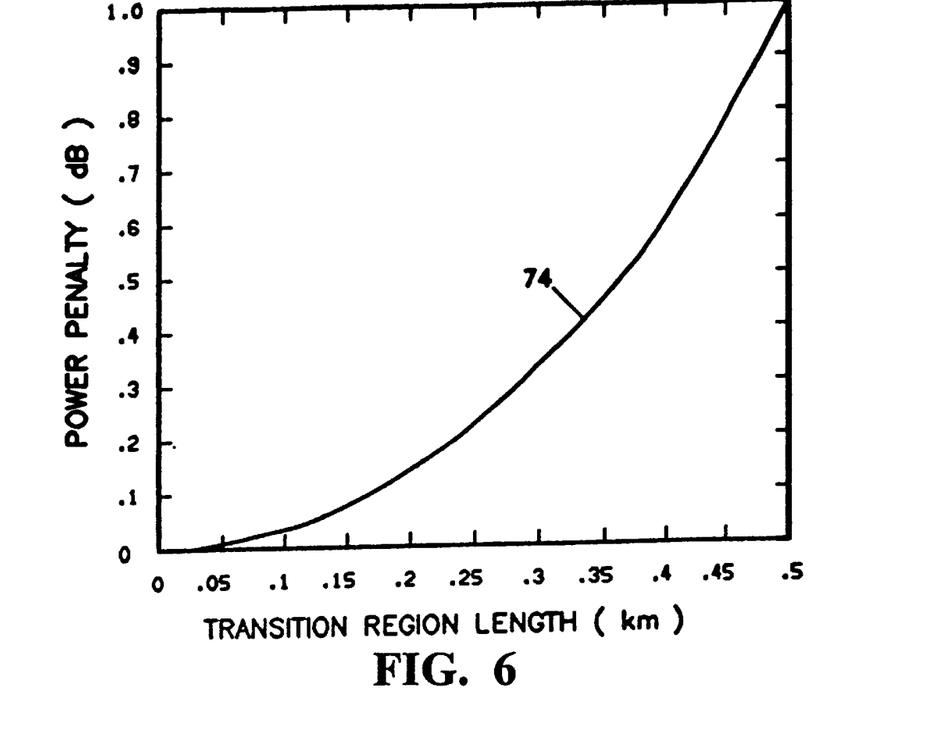
FIG. 6 is a chart of transition region length vs. power penalty.

The following example illustrates the effect of transition length on power penalty. Assume that the input power is 10 dBm. Four channels are used having a frequency separation of 200 GHz. The magnitude of total dispersion is 1.5 ps/nm-km and the oscillation sub-length of the total dispersion is taken to be 2 km. The chart of power penalty vs. transition length, shown as curve 74 in FIG. 6 , shows that shorter transition lengths are preferred.

Fiber Fabrication

Figure 7:
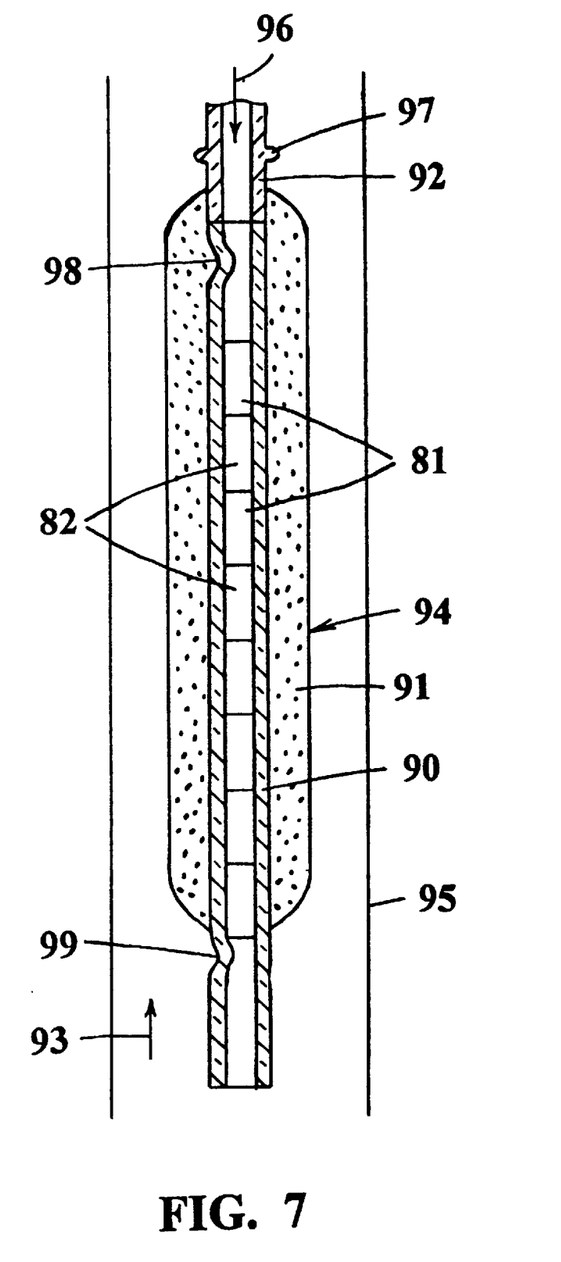
FIG. 7 is a schematic representation of a process of making an optical fiber, adjacent sections of which have distinctly different characteristics.
Figure 8:
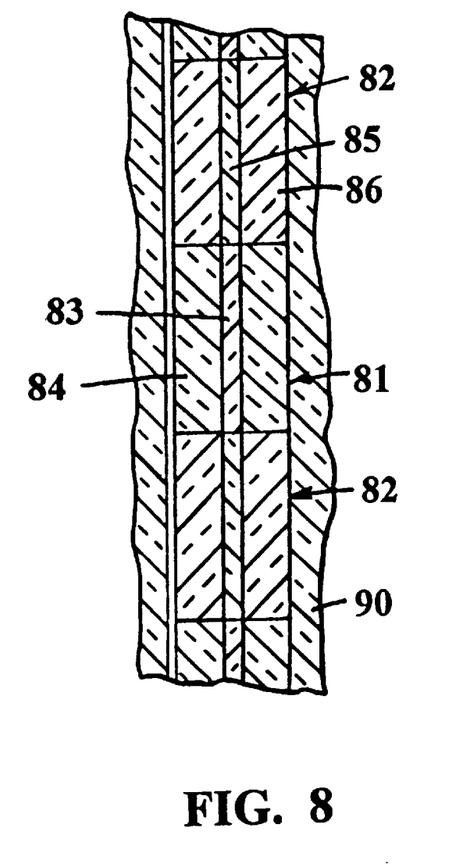
FIG. 8 is an enlarged cross-sectional view of the tablets of FIG. 7.

A method that produces very short transition regions is illustrated in FIGS. 7 and 8. To practice this method, core preforms can be prepared by any known process. Examples of processes that can be employed to make the core preforms are outside vapor deposition (OVD), vapor axial deposition (VAD), modified chemical vapor deposition (MCVD) wherein a core layer is formed inside a glass tube, and plasma chemical vapor deposition (PCVD) wherein the reaction within the tube is plasma induced. The core preform can consist entirely of core glass or it can consist of a core region and a cladding region.

There is initially formed two or more cylindrical preforms that are capable of being overclad and formed into optical fibers having disparate optical characteristics. For most applications only two different types of core preforms are required; two preforms are utilized in the embodiment illustrated in FIGS. 7 and 8.

The first and second preforms are cut into tablets 81 and 82, respectively. The lengths of the tablets depend upon the specific type of fiber being made. In the process of making DM fibers, the lengths of the tablets 81 and 82 are selected to yield in the resultant optical fiber the desired sub-lengths. The tablets can be made by the simple score and snap method. Tablet 81 has a core region 83 and a cladding region 84; tablet 82 has a core region 85 and a cladding region 86.

Figure 9:
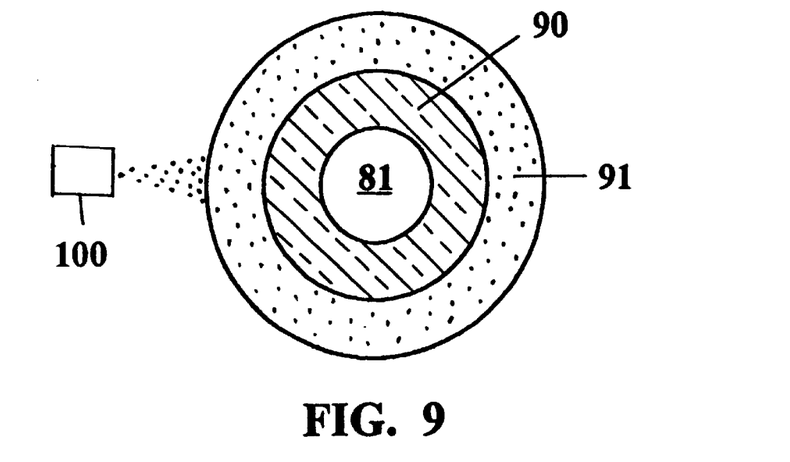
FIG. 9 illustrates the application of a layer of cladding glass particles to a tube.

A tubular glass handle 92 having an annular enlargement 97 is fused to one end of an elongated glass tube 90. Handle 92 is part of a ball joint type gas feed system of the type disclosed in U.S. Pat. No. 5,180,410. Enlargement 97 is adapted to rest on a slotted base of a support tube (not shown) that suspends handle 92 in a consolidation furnace. Tube 90 is heated and a dent 98 is formed near handle 92. Alternatively, that part of handle 92 adjacent tube 90 could be dented. The assembly including tube 90 and handle 97 is inserted into a lathe (not shown)and rotated and translated with respect to burner 100 which deposits on tube 90 a layer 91 of cladding glass particles or soot (see FIG. 9). Coating 91 can be built up to a sufficient outside diameter (OD) that the resultant preform can be consolidated and drawn into an optical fiber having the desired optical characteristics. Layer 91 can overlap handle 92 as shown in FIG. 7.

Tube 90 is oriented so that the end affixed to handle 92 is lower than the other end, and tablets 81 and 82 are alternately inserted into the upper end of tube 90. The tablets cannot fall beyond dent 98. Tube 90 is heated and a dent 99 is formed near that end opposite dent 98. When tube 90 is inverted, dent 99 prevents the tablets from falling from it.

Handle 92 is suspended from a support tube (not shown) which is lowered to insert assembly 94 into consolidation furnace muffle 95. While assembly 94 is heated in the consolidation furnace, a drying gas flows upwardly through the furnace (arrow 93). The drying gas conventionally comprises a mixture of chlorine and an inert gas such as helium. A chlorine-containing gas stream (arrow 96) is flowed from tube 92 into tube 90. Although gas stream 96 could contain a diluent such as helium, pure chlorine is preferred for cleaning purposes. Since the diameter of each of the tablets 81 and 82 is slightly smaller than the inner diameter of tube 90, the chlorine flows downwardly around the entire periphery of each of the tablets; it also flows or diffuses between adjacent tablets. The chlorine then exhausts through the bottom of tube 90. The chlorine functions as a hot chemical cleaning agent. During this hot chlorine cleaning step, the temperature is below the consolidation temperature of soot coating 91 so that the space between tablets 81 and 82 and tube 90 remains open for a sufficient length of time for the required cleaning to occur. The chlorine cleaning step is more effective at high temperatures. It is preferred that the temperature of the cleaning step be at least 1000° C., since at lower temperatures, the duration of the step would be sufficiently long that the step would be undesirable for commercial purposes. Obviously, lower temperatures could be employed if processing time were not a concern. The flow of hot chlorine between the tube 90 and tablets 81 and 82 is very beneficial in that it allows the surfaces of adjacent tablets and of tube and tablets to be brought together without the formation of seeds at their interface. Seeds include defects such as bubbles and impurities that can produce attenuation in the resultant optical fiber.

While assembly 94 is lowered further into the furnace muffle, the wall of that portion of tube 90 at the end of soot layer 91 collapses and fuses together, thereby cutting off the centerline chlorine flow. As an optional step, a valve can then be switched to pull a vacuum within tube 90. As assembly 94 continues its movement into the furnace muffle, first its tip and then the remainder of the assembly is subjected to the maximum furnace temperature which is sufficient to sinter coating 91. Soot coating 91 shrinks both radially and longitudinally as it sinters.

As soot coating 91 shrinks longitudinally, it causes tube 90 to decrease in length. This causes adjacent tablets 81 and 82 to be forced together while they are subjected to sintering temperature, whereby they fuse together without forming seeds. Without this longitudinal shrinking of tube 90, adjacent tablets could not become sufficiently fused to form low loss optical fibers.

As soot coating 91 shrinks radially, it exerts a force radially inwardly on tube 90. This urges tube 90 inwardly against tablets 81 and 82 to form a fused assembly 98 (see FIG. 10) in which the three regions 81, 90' and 91' are completely fused. Region 90' is the collapsed tube, and region 91' is the sintered porous coating. A relatively low density soot provides a greater inwardly directed force; however, the soot coating must be sufficiently dense to prevent cracking.

The consolidation of the tablet-filled overclad tube to yield a seed free preform is a crucial processing step. For the tablets to fuse together without seeds, it is necessary to flow chlorine through the tube to chemically clean all the surfaces. However, the step of applying vacuum after the blank tip fuses is not necessary.

Figure 10:
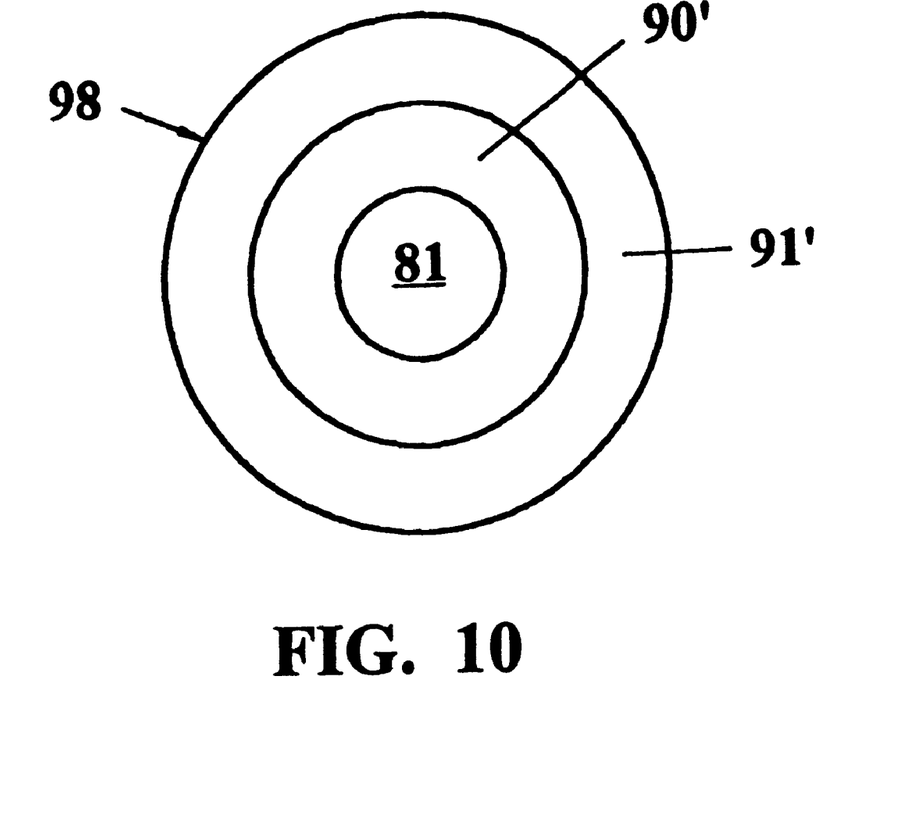
FIG. 10 is a cross-sectional view of the fused assembly resulting from the consolidation/fusion step illustrated in FIG. 7.

The fused assembly is removed from the consolidation furnace. Regions 90' and 91' of fused assembly 98 function as cladding in the resultant optical fiber. Assembly 98 can be used as a draw blank and can be drawn directly into an optical fiber. Fused assembly 98 can optionally be provided with additional cladding prior to the fiber drawing step. For example, a coating of cladding soot can be deposited onto assembly 98 and then consolidated. Alternatively, assembly 98 can be inserted into a cladding glass tube. If additional cladding were added, the diameters of the core regions of tablets 81 and 82 would have to be suitably adjusted.

As compared to fusing the core canes or tablets prior to inserting them into a cladding glass tube, the present method is simple to perform, and it enables the fusion to be carried out in a dry environment. The method is self aligning in that adjacent core canes of different diameter will be centered on the axis of the resultant draw blank when tube 90 collapses inwardly during the sintering of porous glass coating 91.

The method of this invention brings new degrees of freedom in the tailoring of fiber properties. It results in the formation of optical fibers having adjacent regions or lengths of disparate properties. Very abrupt transition regions connect the adjacent fiber lengths. The attenuation of this fiber is identical to that of standard long distance telecommunication fiber, i.e. less than 0.25 dB/km and preferably less than 0.22 dB/km.

Figure 11:
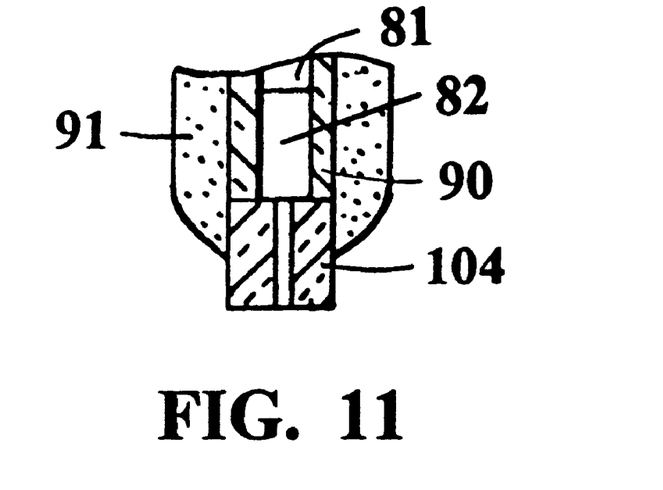
FIG. 11 is a partial cross-sectional view of a modification of the embodiment of FIG. 7.

In the embodiment shown in FIG. 11, dents 98 and 99 are not formed in tube 90. A short length 104 of glass capillary tubing is fused to one end of tube 90, and the glass handle is fused to the opposite end of tube 90. Tablets 81 and 82 are inserted through the handle and into tube 90. The tablets cannot fall beyond tube 104 since that tube has a relatively small bore. When the assembly is lowered into the consolidation furnace to initiate the sintering process, tube 104 initially fuses to cut off the chlorine flow.

Forming DM Fibers

A dispersion managed fiber is formed from core preforms that are capable of forming single-mode optical fibers having different zero dispersion wavelengths. The dispersion of a waveguide length can be changed by varying various waveguide parameters such as geometry, refractive index, refractive index profile, or composition. Any of a large number of refractive index profiles provide the required flexibility for adjusting waveguide dispersion and thereby varying the total dispersion. These are discussed in detail in U.S. Pat. No. 4,715,679, Bhagavatula, and applications Ser. No. 08/323,795, Ser. No. 08/287,262, and Ser. No. 08/378,780.

Figure 12:
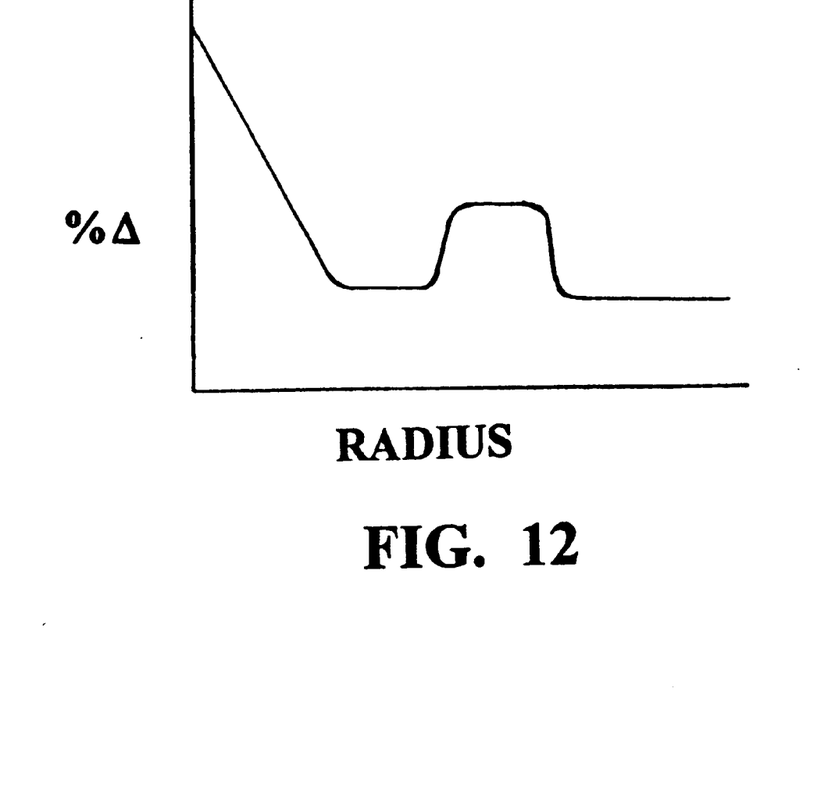
FIGS. 12 and 13 are refractive index profiles of dispersion shifted optical fibers.
Figure 13:
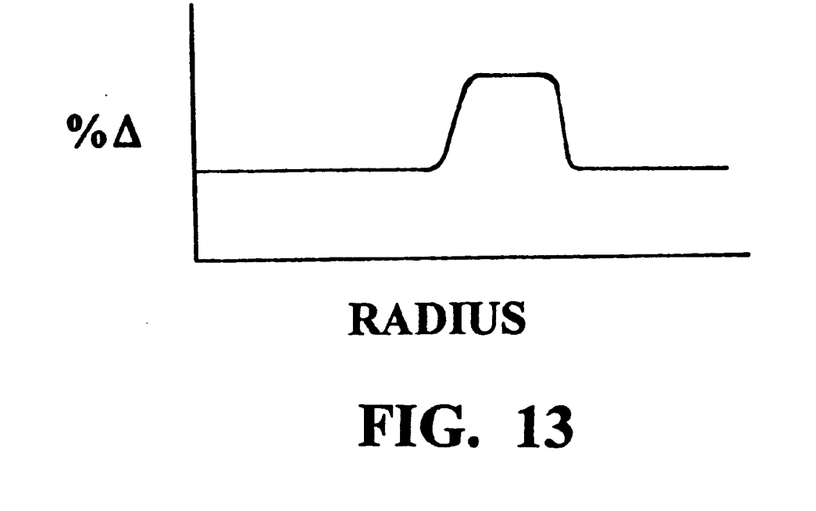

One type of refractive index profile which is useful for forming optical fibers having zero dispersion at predetermined wavelengths is that having a relatively high index central region surrounded by an annular region of depressed index which is in turn surrounded by an outer annular region of index higher than that of the depressed index region (see FIG. 12). The index profile of another embodiment (see FIG. 13) includes an essentially constant index central portion having a refractive index substantially equal to the clad glass refractive index and an adjacent annular region of increased refractive index. Optical fibers having this type of refractive index profile can be easily manufactured.

A simple DM fiber refractive index profile is the step index profile. Two core preforms could be formed of the same core and cladding materials, the radius of one core region being larger than that of the other. The draw blank is drawn to a fiber having lengths of a first core radius interspersed between lengths of a second core radius that is larger than the first radius. A core diameter difference of about 5% to 25% is sufficient to produce the desired positive to negative dispersion variation. A range of radii variation of 5% to 10% is, in general, sufficient for most applications.

The following example describes the formation of a single-mode DM fiber suitable for providing zero dispersion at 1545–1555 nm. Two different core preforms were made by a method similar to that disclosed in U.S. Pat. No. 4,486,212 which is incorporated herein by reference. Briefly, the method of that patent includes the steps of (a) depositing glass particles on a mandrel to form a porous glass preform, (b) removing the mandrel and consolidating the porous preform to form a dry, sintered preform, (c) stretching the sintered preform and closing the axial aperture therein. The core preform included a central region of core glass surrounded by a thin layer of cladding glass. Both of the core preforms had core refractive index profiles of the type shown in FIG. 12. The first core preform was such that if it were provided with cladding and drawn into a single-mode fiber having a 125 μm OD, it would exhibit zero dispersion at 1520 nm. The second preform is such that if it were similarly formed into a 125 μm OD single-mode fiber, its zero dispersion wavelength would be 1570 nm. The core preforms were stretched to diameters of 7 mm and 7.1 mm. The first and second stretched preforms were scored and snapped to form tablets 81 and 82 of substantially equal length. Tablets 81 had core regions 83 and cladding regions 84; tablets 82 had core regions 85 and cladding regions 86.

A one meter length of silica tube 90 was employed; it had an inside diameter (ID) of 7.5 mm and an O.D. of 9 mm. The technique described in conjunction with FIG. 7 was employed to load tablets 81 and 82 into tube 90. Coating 91 was built up to a sufficient OD that the resultant preform could be consolidated and drawn into a 125 μm OD single-mode fiber.

The resultant assembly 94 was suspended in a consolidation furnace. While assembly 94 was rotated at 1 rpm, it was lowered into consolidation furnace muffle 95 at a rate of 5 mm per minute. A gas mixture (arrow 93) comprising 50 sccm chlorine and 40 slpm helium flowed upwardly through the muffle. A centerline flow of 0.3 slpm chlorine flowed downwardly around tablets 81 and 82 and exhausted from the bottom of tube 90. The maximum temperature in the consolidation furnace was about 1450° C. As assembly 94 moved downwardly into the furnace, the centerline chlorine flow chemically cleaned the surfaces of tablets 81 and 82 and the inner surface of tube 90. As assembly 94 moved further into the furnace muffle, that region of tube 90 below the tablets fused and cut off the centerline chlorine flow. A valve (not shown) was then switched to pull a vacuum within tube 90. Assembly 94 continued its movement into the furnace muffle, and coating 91 was sintered. Tube 90 was forced inwardly against tablets 81 and 82, and the contacting surfaces of all of the glass elements became fused. As soot 91 sintered, tube 90 became shorter, and seed-free fused joints were formed between adjacent tablets.

After being removed from the consolidation furnace, draw blanks formed by this process were drawn to form DM optical fibers having an OD of 125 μm. Single-mode DM optical fibers made by this process have been drawn without upsets; attenuation has typically been 0.21 dB/km. This is the same attenuation that would have been exhibited by a single-mode dispersion shifted optical fiber drawn from a preform formed by overcladding one of the 7 mm core canes.

The two different types of tablets that were employed in the fiber making process combined to provide a zero dispersion wavelength of 1545–1555 nm. The zero dispersion wavelength was determined by the total lengths of each kind of core in the fiber. The zero dispersion wavelength of the fiber could be changed by cutting off a portion at one end of the fiber, thus changing the ratio of the lengths of each kind of core in the fiber.

The oscillation sub-lengths and the period are controlled by the lengths of the core preform tablets. Fibers having oscillation sub-lengths of 1.2 to 2.5 km were drawn.

Other Fiber Types

The method of the invention has been specifically described in connection with the manufacture of DM single-mode optical fibers, and a description of a method of making such a fiber is set forth in the preceding specific example. However, it can be employed to make many other types of optical fibers having optical properties that systematically vary along the fiber's length. In each instance, the fiber can be made by inserting the appropriate tablets into a tube and processing the tube as described above.

Spontaneous Brilluoin Scattering (SBS) can be minimized by providing a fiber with alternate lengths that exhibit significantly different values of Δ, wherein Δ is defined as $(n_1^2 - n_2^2)/2n_1^2$ ($n_1$ and $n_2$ are the refractive indices of the core and cladding, respectively. One of the types of tablets that is used to make the fiber preform exhibits a given Δ, and the other type of tablet exhibits a significantly different value of Δ. The Δ-value of a fiber core can be controlled by controlling the amount of a dopant in the core or by changing the composition of the core, i.e. by adding other dopants to the core. Numerous dopants including oxides of tantalum, aluminum, boron can be employed for the purpose of changing refractive index and other properties such as viscosity.

A fiber that provides a filtering function could be made by alternately disposing in a tube a plurality of tablets that are capable of forming optical fiber having a filtering function and a plurality of tablets that are capable of forming standard, non-filtering optical fiber.

The tablets need not be of equal or nearly equal lengths. For example, a fiber could include relatively short sections, the cores of which are doped with active dopant ions capable of producing stimulated emission of light when pumped with light of suitable wavelength. Dopant ions of a rare earth such as erbium are particularly suitable for this purpose. Thus, a fiber having sections of erbium-doped core located at spaced intervals along its length could be made by employing relatively long tablets of standard, erbium-free core and relatively short tablets of erbium-doped core.

A fiber where the core systematically decreases in size such as that employed in Soliton fibers could be made by inserting into the tube a plurality of tablets, each having a core diameter smaller than the previous one or each having a core diameter larger than the previous one. Alternatively, some other core characteristic that affects dispersion could be varied in the tablets so that the dispersion of the resultant fiber monotonically decreased from one end of the fiber to the other.

Figure 14:
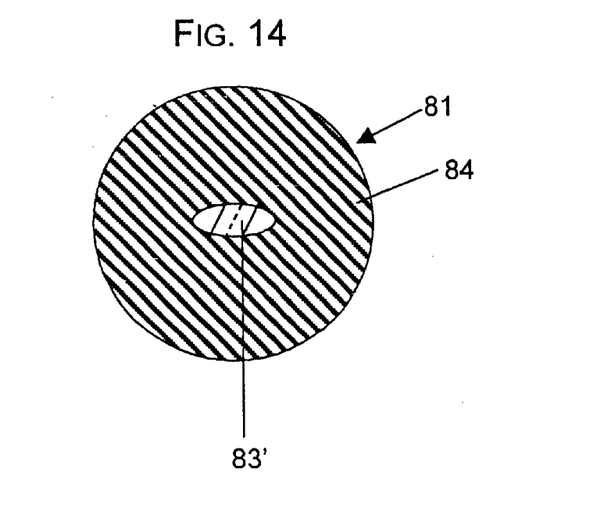
FIG. 14 is a top cross sectional view of a tablet with an elliptical core.
Figure 15:
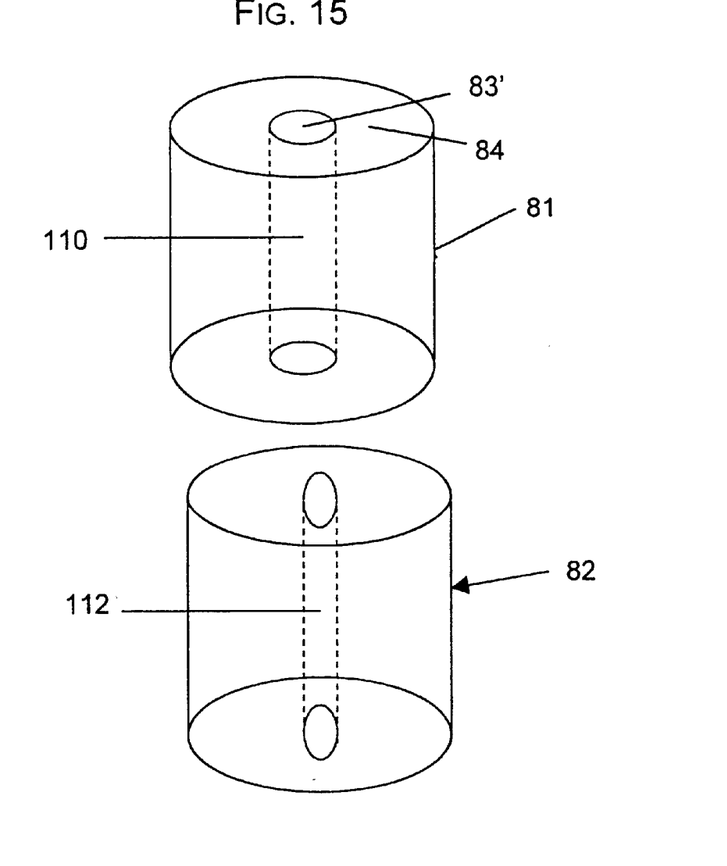
FIG. 15 is an exploded view of two adjacent tablets with unaligned elliptical cores.

The above-described examples employ alternately disposed tablets that have disparate optical properties. In one embodiment, a single core preform could be used to form all tablets. A single preform is formed such that its core has an azimuthally asymmetrical refractive index profile. For example, the core could be slightly out of round, i.e. the core cross-sectional shape of the core is an ellipse having a major axis and a minor axis (see U.S. Pat. No. 5,149,349). As shown in FIG. 14, the tablet 81 optionally may have an elliptical core 83'. The core 83', as shown, is encompassed by cladding material 84. In FIG. 15, two adjacent tablets 81, 82 having elliptical cores are shown. The respective cores of tablet 81 and tablet 82 are unaligned as shown in phantom by reference numerals 110 and 112. Alternatively, the fiber could contain stress rods on opposite sides of the core as disclosed in U.S. Pat. No. 5,152,818. An elliptical core fiber can be formed as follows. Tablets are severed from the preform. A cladding glass tube is provided with a coating of cladding glass soot. The tablets are inserted into the cladding glass tube such that the major axis of the elliptical core of one tablet is rotated with respect to the major axes the cores of adjacent tablets. After the cladding soot is consolidated and the tablets are fused to the tube and to each other, the resultant draw blank is drawn into an optical fiber having low polarization mode dispersion.

Although particular embodiments of the invention have been discussed in detail, the invention is nevertheless limited only by the following claims.

What is claimed is:

1. A method of making an optical fiber preform comprising the steps:

depositing a coating of cladding glass particles on the outer surface of a cladding glass tube having first and second ends, inserting a plurality of tablets into said cladding glass tube, at least one optical characteristics of at least one of said tablets in said cladding glass tube being different than that of an adjacent tablet, each tablet having at least a central region of core glass, wherein the core region of at least a first of said tablets contains a dopant capable of amplifying light, and the core region of at least one tablet adjacent said first tablet is free from said dopant, heating the coated assembly to a temperature less than the sintering temperature of said cladding glass particles, flowing through said tube a gas selected from the group consisting of pure chlorine and chlorine mixed with a diluent gas, and thereafter heating the coated assembly to sinter said coating, thereby generating a radially-inwardly directed force that causes said tube to collapse onto and fuse to said tablets, and causing said cladding glass tube to shrink longitudinally, whereby adjacent tablets are urged toward one another and are fused to one another.

2. The method of claim 1 wherein each of said tablets comprises a cladding region surrounding said central core glass region.

3. The method of claim 2 wherein at least two adjacent tablets in said cladding glass tube have a core having an elliptical cross-section, the major axes of the cores of said at least two adjacent tablets being unaligned.

4. The method of claim 1 wherein said gas consists of pure chlorine.

5. The method of claim 1 wherein said chlorine containing gas comprises chlorine and a diluent gas.

6. The method of claim 1 wherein, during the step of collapsing said cladding glass tube onto said tablets, the step of flowing a gas continues until it is discontinued by the collapsing of a softened glass member.

7. The method of claim 6 wherein a region of said cladding glass tube near the second end thereof is deformed inwardly, and wherein during the step of collapsing said cladding glass tube onto said tablets, the flow of centerline gas continues until it is discontinued by the collapsing of said cladding glass tube.

8. The method of claim 6 wherein an extension tube is fused to the second end of said cladding glass tube, and wherein during the step of collapsing said cladding glass tube onto said tablets, the flow of centerline gas continues until it is discontinued by the collapsing of said extension tube.

9. The method of claim 1 wherein, after said cladding glasstube collapses onto said tablets, the source of said gas is disconnected from said first end of said cladding glass tube, and a vacuum source is then connected to the second end of said cladding glass tube.

10. The method of claim 1 wherein the refractive index profile of one of said tablets is different from that of an adjacent tablet.

11. The method according to claim 1 wherein said heating of the coated assembly forms a sintered preform and further comprising forming an optical fiber from said sintered preform, said fiber consisting of a plurality of longitudinal sections, each section corresponding to one of said tablets.

12. The method of claim 11 wherein the core region of each of said tablets in said cladding glass tube is different from the core regions of each of the remainder of said tablets.

13. The method of claim 12 wherein the optical characteristics of said tablets are such that each section of said fiber exhibits a dispersion less than that of the adjacent section, when said sections are analyzed from one end of said fiber to the other end thereof.

14. The method of claim 11 wherein the optical characteristics of said tablets are such that each section of said fiber exhibits a value of $\Delta$ that is different from the value of $\Delta$ of the adjacent section of fiber, wherein $\Delta=(n_1^2-n_2^2)/2n_1^2$, and $n_1$ and $n_2$ are the refractive indices of the core and cladding of said fiber, respectively.

15. The method of claim 11 wherein the optical characteristics of said tablets are such that at least a first of said sections of fiber propagates a given wavelengh of light and at least one section of fiber adjacent said first section filters said given wavelengh of light.

16. The method of claim 11 wherein said flowing occurs prior to said heating the coated assembly to a temperature less than the sintering temperature of said cladding particles.

17. The method according to claim 11 wherein a radial refractive index profile of said one tablet being different from that of said adjacent tablets, said flowing includes flowing said gas between adjacent tablets and out of the second end of said tube, and said heating of the coated assembly forms a sintered preform and further comprising forming an optical fiber from said sintered preform, said fiber consisting of a plurality of longitudinal sections, each section corresponding to one of said tablets.

18. The method of claim 17 wherein the optical characteristics of said tablets are such that those sections of fiber that correspond to said first of said tablets exhibit a given dispersion at a given wavelength of light and those sections of fiber that correspond to said at least one tablet adjacent said first tablet exhibit a second dispersion different from said given dispersion at said given wavelength of light, whereby the dispersion of said fiber at said given wavelength is a value between said given dispersion and said second dispersion.

19. The method of claim 17 wherein said flowing takes place in a furnace and a temperature in said furnace comprises about 1450° C. or less.

20. The method of claim 1 further comprising forming the tablets by a technique selected from the group of techniques consisting of vapor axial deposition, modified chemical vapor deposition, plasma chemical vapor deposition, and outside vapor deposition.

21. The method of claim 20 wherein an optical fiber drawn from the preform has an attenuation of less than 0.25 dB/km.

22. The method of claim 1 further comprising pulling vacuum within the tube.

23. The method of claim 1 wherein said flowing takes place in a furnace and a temperature in said furnace comprises about 1450° C. or less.

24. The method of claim 1 wherein said flowing occurs prior to said heating the coated assembly to a temperature less than the sintering temperature of said cladding glass particles.

25. The method of claim 1 further comprising drawing an optical fiber from the preform wherein the adjacent tablets are arranged such that the fiber has regions of positive total dispersion and regions of negative total dispersion.

26. The method of claim 25 wherein the total dispersion for the drawn fiber is substantially zero.

27. The method of claim 26 wherein the fiber has an attenuation of less than 0.25 dB/km.

28. The method of claim 25 wherein the total dispersion varies from a first preselected value to a second preselected value for the adjacent tablets and said first preselected value is of an opposite sign of said second preselected value.

29. An optical fiber made in accordance with claim 25 wherein said optical fiber comprises a low loss optical fiber.

30. The optical fiber of claim 29 wherein an attenuation exhibited by said fiber comprises 0.25 dB/km or less.

* * * * *